Jan. 3, 1928.
R. S. MOORE
1,654,826
AIR PURIFIER AND COOLER
Filed Aug. 10, 1922
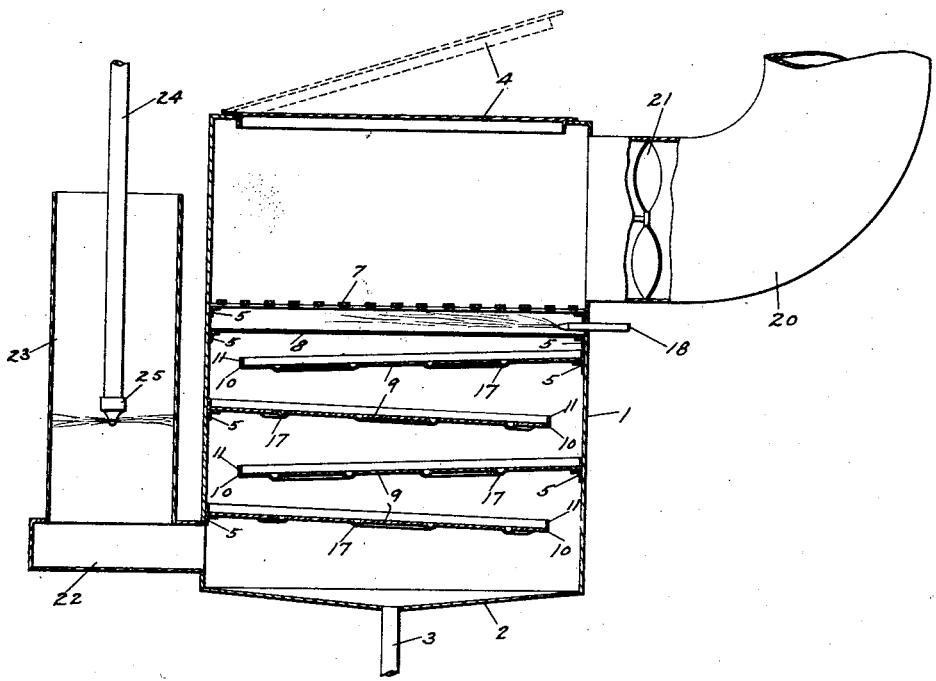
Fig. I
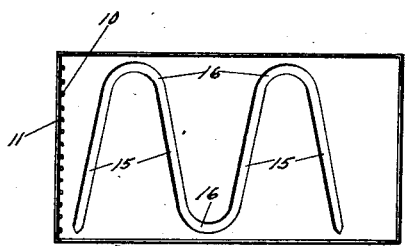
Fig. II
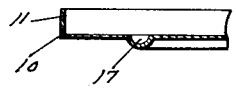
Fig. III
INVENTOR:
Roscoe S. Moore,
BY
Atkins & Atkins
ATTORNEYS.

Patented Jan. 3, 1928.

1,654,826

UNITED STATES PATENT OFFICE.

ROSCOE S. MOORE, OF PORTLAND, OREGON.

AIR PURIFIER AND COOLER.

Application filed August 10, 1922. Serial No. 580,967.

My invention relates to apparatus for purifying and cooling air and has for its main objects the production of means for thoroughly cleansing a current of air of dust-like impurities carried in suspension thereby, and for cooling it in the cleansing operation so as to render it available for delivery as into a dwelling or living compartment in a cool and sanitary condition.

In apparatus for carrying into effect the objects of my invention, three distinctive features, among others, are deemed to be of special importance. One is the initial washing of the air to be cleansed and cooled and before it enters the body of the apparatus in which the cooling effect upon the air is, in the main, produced. The second feature referred to is the causing the current of washed air to pass over and through a counter current of cold water with provision against stagnation and consequent pollution of any part of it, by keeping the entire body of the water constantly in motion. The third feature consists in subjecting the whole volume of the washed and cooled air to the action of a strainer which not only contributes to the final cleansing of the air but also to reducing its humidity to a desired uniformity of degree.

What constitutes my invention will be hereinafter specified in detail and succinctly set forth in the appended claims.

In the accompanying drawing

Figure I is a vertical longitudinal section of a present preferred form of my invention showing the air discharge pipe thereof in elevation, partially broken away to show the fan therein.

Figure II is a plan view of a baffle plate of my apparatus, as shown in Figure I, detached.

Figure III is a detail view showing in transverse section the trough construction of the baffle plates illustrated in the previous figures.

Referring to the numerals on the drawing, 1 indicates a closed chamber that may be made of any suitable material or materials and of any preferred capacity, shape, and relative dimensions. It is preferably provided with a dish-shaped bottom 2, from which a drain pipe 3 leads, and with a movable, close fitting, preferably hinged, lid 4. Within the chamber 1, and projecting inwardly from the walls thereof to which they are attached, are at suitable intervals disposed, in sets, a series of brackets 5. Each of said sets is designed and adapted to carry a removable member that is, in operative assemblage, laid upon it.

In Figure I are shown six of said members, to wit, a grid 7, which is the uppermost of said members, a strainer 8, and a series of baffle plates each indicated by the numeral 9. The grid and strainer aforesaid are preferably each of horizontal disposition and fill the chamber 1 from side to side and end to end. The baffle plates are each a little shorter than the interior dimension of the chamber would admit, so that when disposed as shown in Figure I, in alternate order, their free ends define a circuitous passage through which a column of air must pass in ascending through the chamber from bottom to top thereof. The grid 7 is preferably made of galvanized iron with open slat construction of the kind generally used in ice boxes, for example. The strainer 8 is preferably made of reticulated fabric woven of wire or of cotton or other fiber. The fineness of its reticulations largely determine its functional efficiency, which may be augmented, especially if cloth fabric be used, by employing a composite sheet comprising a multiplication of layers or thicknesses.

The baffle plates 9 are preferably made of sheet metal which are imperforate except in respect to a row of small holes 10 with which each is provided adjacent to its free end. That end is in practice, as shown in Figure I, slightly depressed horizontally below its opposite end, so as to impart to the plate a gentle inclination towards its free end or edge from the opposite end or edge that is disposed in snug juxtaposition to an interior vertical wall of the chamber 1.

Beyond the row of holes 10 each plate is provided with an upstanding flange 11 which acts as a dam to compel egress of liquid only by way of the said holes and in the form of jets or drops. The flange 11 may be, and preferably is, extended around all sides of each baffle plate so as to confine its liquid covering to the surface of the plate and at the same time to give stiffness to the plate.

It being a function of each baffle plate to effect a cooling of the column of air which, in operation, travels against it, provision is made for keeping it constantly supplied with a sufficiency of water to form an unbroken film or sheet upon its upper surface. It is important that said sheet or film be kept fresh and free from contamination that comes from stagnation. It is for that reason that inclination of disposition is imparted, as has been already specified, to each baffle plate. Besides, and as contributing to the same end, I prefer to provide in the surface of each plate a guide channel made up of a succession of straight reaches 15 and bends 16 uniting the same. Each reach has a downward inclination, that is to say, towards the depressed end of the plate and at a slight angle from a line parallel to the transverse axis.

The guide channel may be formed by a wall upstanding from the face of the plate or by a trough 17 or depression below the surface thereof. Figure III serves to illustrate both forms of channel, inasmuch as the trough 17 as shown in Figure III constitutes a projection in respect to one side of the plate and a depression in respect to the other side of the plate. A preference for the trough effect is supported by the fact that it affords a channel for a constant flow of water which cools the downwardly projecting walls of the trough through which it flows, thereby constituting cooling members extending into the space between adjoining plates 9 between which the air to be cooled, in its ascent through the chamber 1, passes.

18 indicates a water supply pipe that is introduced by a tight joint through a side wall of the chamber 1, either just above or just below the strainer 8. If located above the strainer 8, as shown in Figure I, the pipe 18 terminates in a solid-discharge nozzle, preferably of fan shape, although the shape is not essential since capillarity may be depended upon to spread the water discharge throughout the body of the material of which the strainer is made. If, on the other hand, the pipe 18 is located below the strainer, it should terminate in a finely comminuting spray nozzle so that the upflow of the current of air from below it may lift the spray against the under surface of the strainer and keep it super-saturated with the effect, in either instance, of maintaining a constant shower, like rain, evenly distributed over and precipitated from the whole lower surface of the strainer. The strainer 8 serves, in addition to its function as a water distributor, as a filter for the ascending current of moisture laden air which in effect it drys, cleanses, and cools in passage.

Above the grid 7, I provide an air discharge pipe 20 of ample capacity, and, within said pipe, a suction fan 21 which may be driven by an electric or other motor.

Communicating with the interior of the chamber 1 at a point elevated a little above the bottom thereof and preferably on the side thereof opposite the air discharge pipe 20, I provide a closed box 22, that is surmounted by an air intake flue 23 which is open at the top and in communication with the atmosphere. By extension of the flue 23 the intake of air may be made at any convenient point at which a supply of air free from grosser impurities may be available. It is only essential, however, that the flue 23 shall be high enough to contain the volume of spray or mist that is generated in it for the initial washing of air drawn in through it.

For effecting the initial washing of the air, I provide a supply of water, that is preferably delivered as from a pipe 24 by means of one or more laterally discharging members, for example a spray nozzle 25. The transverse capacity of the flue 23 is such that discharge from the nozzle 25 makes forcible impact against the surrounding walls of the flue with the effect of shattering the globules formed by the spraying operation of the nozzle into particles of finest comminution, thereby, as long as the machine is in operation, keeping the flue filled or adequately supplied with a cloud of mist through which the intake of air through the open top of the flue must pass before it enters the chamber 1.

By this means the intake of air is thoroughly cleansed of all dust-like impurities which are caught by the water condensed from the mist in the flue and being precipitated are washed down into the dish-shaped bottom 2 of the chamber 1, whence they are drawn off through the drain pipe 3.

The operation of my apparatus may be understood from the following description.

The apparatus being properly installed, water is supplied from any suitable source of supply, as for example a city main, through the pipes 18 and 24, and the fan 21, being set in motion, produces a constant flow of air which, entering through the flue 23, passes downwardly and then upwardly through the chamber 1 and thence is delivered at any point desired, through the discharge pipe 20.

In passing through the flue 23 and the box 22, the air receives an initial washing in the manner already specified, and is to some degree cooled. Afterwards, to reach the discharge pipe 20, the air is forced to travel between the water cooled baffle plates 9 and through veils of falling water discharged at the lower end of each baffle plate from the row of holes 10 therein.

Finally, the current of air, after passing through the water-laden atmosphere precipitated, as in the form of rain, from the strainer 8, is sucked by the fan 21 through the body of the strainer and by it and by the water bath reduced to the degree of dryness desired.

The supply of water precipitated through the interior of the chamber 1, may be derived exclusively from the pipe 18, or exclusively from the water of liquefaction derived from ice supported upon the grid 7 within the chamber 1, or it may be under some conditions desirable to draw the water both from the pipe 18 and the liquefaction of ice, conjointly.

It may be observed, that the grid 7, strainer 8, and the several baffle plates 9, being made removable at will, they may be readily withdrawn or introduced into place through the lid-covered aperture provided for that purpose in the top of the chamber 1. By this means provision is made for scouring the fixtures and the interior walls of the chamber in order to keep it in substantially perfect sanitary condition, and to render the use of the apparatus about sick rooms entirely safe under all conditions. If occasion demand, in order to meet extraordinary conditions, the water supply to the apparatus may be kept medicated, by any ordinary method, with any suitable antiseptic chemical agent desired.

What I claim is:

1. In an air cooling apparatus, the combination with a chamber having means of air intake adjacent its lower end, mist generating means adjacent said lower end, an air outlet conduit at the upper end of said chamber, means for supporting a refrigerant in the upper end of said chamber, a fabric screen extended transversely in the chamber below said refrigerant supporting means, means for discharging a spray of liquid horizontally between said refrigerant supporting means and said screen, means for creating a water curtain below said screen, through which air is drawn, and suction means disposed in said outlet conduit, for sucking air through said chamber and elements disposed therein.

2. In an air treating apparatus, the combination with a chamber having means for cleaning and humidifying air, and a suction outlet for the air disposed adjacent the top thereof; of an elongated vertically disposed air inlet flue communicating at its lower end with the lower end of said chamber to furnish air thereto, and a mist creating nozzle disposed in said flue adjacent the lower end thereof for maintaining said elongated air inlet flue substantially filled with mist through which air is caused to enter said chamber.

In testimony whereof, I have hereunto set my hand.

ROSCOE S. MOORE.